United States Patent [19]

Schumacher

[11] Patent Number: 4,619,053
[45] Date of Patent: Oct. 28, 1986

[54] PROCESS AND APPARATUS FOR DESOLVENTIZING FLAKY OR GRANULAR VEGETABLE RESIDUE MATERIAL OBTAINED IN THE EXTRACTION WITH ORGANIC SOLVENTS

[76] Inventor: Heinz O. Schumacher, Höperfeld 26, D-2050 Hamburg 80, Fed. Rep. of Germany

[21] Appl. No.: 539,796

[22] Filed: Oct. 7, 1983

[51] Int. Cl.$^4$ ............................................. F26B 3/16
[52] U.S. Cl. ...................................... 34/12; 34/173; 34/33; 99/483; 426/465
[58] Field of Search ................... 34/171, 172, 173, 12, 34/33; 432/131, 139; 110/247; 99/483, 485; 426/465, 466

[56] References Cited

U.S. PATENT DOCUMENTS

| 832,874 | 10/1906 | McElroy . | |
|---|---|---|---|
| 2,585,793 | 2/1952 | Kruse | 99/98 |
| 2,666,269 | 8/1949 | Parry | 34/10 |
| 2,776,894 | 1/1957 | Kruse . | |
| 2,806,297 | 9/1957 | Hutchins | 34/173 |
| 2,914,388 | 11/1959 | Kelley | 23/288 |
| 3,126,285 | 3/1964 | Lippold | 99/98 |
| 4,376,073 | 3/1983 | Farmer | 426/656 |
| 4,380,127 | 4/1983 | Roberts | 34/197 |
| 4,503,627 | 3/1985 | Schumacher | 34/173 |

FOREIGN PATENT DOCUMENTS

| 1064458 | 9/1959 | Fed. Rep. of Germany . |
| 1189523 | 3/1965 | Fed. Rep. of Germany . |
| 1542042 | 3/1970 | Fed. Rep. of Germany . |
| 1783152 | 10/1972 | Fed. Rep. of Germany . |
| 2202539 | 8/1973 | Fed. Rep. of Germany . |
| 2608712 | 1/1977 | Fed. Rep. of Germany . |
| 1301548 | 9/1961 | France . |
| 820732 | 9/1959 | United Kingdom . |
| 875165 | 8/1961 | United Kingdom . |

OTHER PUBLICATIONS

"Der Desolventizer-Toaster-Trockner-Kuhler (TTK), ein neues Verfahren bei der Verarbeitung von Olsaaten", Von H. Schumacher, pp. 56-59, 1/1976, Fette-Seifen-Anstrichmittel.

Primary Examiner—Larry I. Schwartz
Attorney, Agent, or Firm—Lane & Aitken

[57] ABSTRACT

The desolventizing of solvent-wet extraction residue which is obtained in the extraction of vegetable material such as soybean, rape, nut and other kernel or seed material etc. with organic solvents, such as hexane, benzine etc., is effected in a continuously operating multistage or multi-compartment system of specific construction by means of superheated steam or a fluid containing superheated steam. In this, at least 45%, but particularly 100%, of the superheated steam is introduced below the lowermost bottom plate, which serves exclusively to distribute the steam, and the steam is conducted in opposition to the solvent-wet material. The temperature of the escaping vapors is maintained at about 66°-68° C. (150.8°-154.4° F.). The apparatus is equipped with double bottoms (3) which are steam heated (6') and the bores of which are formed by a plurality of individual distance pieces or spacers (12) interconnecting the upper and lower plates of the bottoms. The lowermost bottom (4) as well as the steam inlet chamber (E) are also capable of being heated by steam.

22 Claims, 11 Drawing Figures

PROCESS AND APPARATUS FOR DESOLVENTIZING FLAKY OR GRANULAR VEGETABLE RESIDUE MATERIAL OBTAINED IN THE EXTRACTION WITH ORGANIC SOLVENTS

BACKGROUND OF THE INVENTION

The invention relates to a process and apparatus for gentle, energy-saving, and non-polluting desolventizing of heat-sensitive, flaky or granulated residue material, so-called meal, that is obtained in the extraction of natural substances, particularly seeds, by means of organic solvents, said meal being treated in a continuous process with steam or with a steam-containing fluid and being thereby freed of solvent.

DISCUSSION OF RELATED ART

By, the process and the apparatus adapted for carrying out said process in accordance with the present invention involve such processes by which the solvent shall be substantially, if not entirely, driven out of solvent-wet extraction residue. Such meals, besides containing up to 22% by weight and more moisture, may still contain 25% by weight and more, occasionally even up to 35% by weight, of solvent. These considerable quantities must be recovered not only on grounds of the economy of an extraction plant; there must also be obtained desolventized meals which allow safe shipment and further utilization without any hesitation or objection.

Addressed by the invention are particularly such solvent-wet meals as are obtained in the extraction of seed material, such as soybean, rape, sunflower seed, turnip seed, nut material, etc. in the oil and fat industry with the aid of preferably low-boiling point hydrocarbons. The solvents or extractants used for this are, inter alia, benzene, propane, butane, pentane, hexane or mixed solvents, such as mixtures of the above-mentioned hydrocarbons with alcohols, ketones or quite generally polar solvents etc.

The so-called miscella formed in the extraction of the above-mentioned raw materials with the respective suitable solvents and consisting of solvent and oils and fats dissolved thereby is separated from the residue (meal) and passed on for further processing (purification, distillation, driving off of solvents, etc.).

The residue of the extraction, i.e. the above-mentioned meals consisting of residue material, solvent and water, is treated in the desolventizing apparatus with a view to recovering the solvent and obtaining a low-solvent or solvent-free meal, as already indicated above.

Processes and apparatus suitable for this desolventizing have long been known in the and are offered by the respective industry as a under the terms toaster, desolventizer, drier or steamer in many, more or less efficient designs. The extraction residue is freed substantially from the adhering solvent by steam or steam-containing fluids, and the solvent is returned to the extraction apparatus in a mostly continuous operation.

The U.S. Pat. No. 2,585,793 discloses a so-called toaster designed particularly for extracted soybean flakes (soybean meal) wherein, in the upper region of a multistage or multi-compartment system, the desolventizing, and possibly also the drying, is effected by direct feeding-in of steam into the solvent-containing material.

A known desolventizer frequently used in the field of the industrial production of oils and fats, which is based on the principle of the counter-current action of steam and, if necessary, hot air on the solvent-wet meal and derives from development work of the applicant of the present invention, is described in "Fette-Seifen-Anstrichmittel", 78 (1976, pages 56–59).

This apparatus, which is also designated as "Desolventizer-Toaster-Drier-Cooler" (TTK), operates fully continuously, and in the desolventizing stage thereof, pure steam is used.

Therein, the solvent-wet material being continuously introduced through a sluice or valve is conducted in opposition to the steam in a closed, vessel of one-compartment or multi-compartment design and constantly moved or agitated on the bottom or bottoms downwardly defining the individual compartments by multi-arm agitator elements secured on a central agitator shaft. After a predetermined time, the material will either get into the next following stage or be discharged from the apparatus through rotary valves or sluices. During this process, the treating medium, i.e., in the special case of desolventizing, the steam, is fed, through the compartment bottoms, which are in the form of double bottoms, and through the perforated upper bottom plate, into the compartment adjoining the latter. The steam for the desolventizing, or hot air for the subsequent drying (in a succeeding compartment), streams through the material being agitated on the perforated plate by the agitating elements and leaves the apparatus, together with the driven out solvent, as so-called vapors.

Multi-compartment devices or systems of this type in many cases serve also for simultaneous drying and cooling of the desolventized material, the desolventizing taking place in the uppermost or first compartment of the multistage system.

In the apparatus or device known from "Fette-Seifen-Anstrichmittel (loc.cit.), the solvent-wet material (meal) thus is desolventized by direct steam action through the perforated upper plates of the double bottoms. The meal having been desolventized—either with or without subsequent drying and cooling—leaves the plant in a continuous stream as a low-solvent or "solvent-free" material. Thereby, there are achieved extremely uniform retention times and uniform admission of steam or subjection to steam, results which have to be rated as especially significant advantages of the known apparatus.

An apparatus also operating with a perforated double-bottom is described in U.S. Pat. No. 2,776,894. However, in view of the general apparatus structure of this device, it is necessary for achieving a fairly satisfactory degree of desolventizing additionally to introduce direct steam into the material above the bottoms. This results in overheating, agglutination of material, and unusually high steam consumption.

DE-C 26 08 712 relates to an apparatus serving the same purpose wherein live steam is introduced into the vessel in a multi-compartment system through the lowermost steam distributor thereof being constructed as a perforated or sieve bottom and is caused to stream upwardly, through likewise perforated intermediate bottoms between the compartments, in opposition to the solvent-wet material throughout the entire height of the vessel. Additionally, each stage or compartment can itself be supplied with steam through further steam inlets, so as to prevent supersaturation of the upwardly streaming steam or condensation of said steam in the upper, cooler areas of the device. Also, the additional feeding in of steam into the individual compartments makes it possible to maintain or adjust a desired temperature profile within the entire system. The apparatus according to DE-C 26 08 712 already attains a relatively uniform distribution and admission of steam, which is due especially also to the throughgoing perforation of all the bottoms, and, thus, also of the bottoms between the compartments or stages. In this apparatus, the material is treated very gently, and the expulsion of solvent is brought to very low residual values at low steam consumption as well as improved general efficiency in regard to energy.

Another publication that must be considered as belonging to the state of the art is DE-C 11 33 969, which describes an apparatus having hollow bottoms centrically arranged about the centrically disposed vertical rotary shaft. The hollow bottoms fill or occupy only a portion, preferably only one half of the cross-section of the apparatus, so that steam can be admitted only to that portion of the bottoms. In this known apparatus, it is provided that the intermediate bottom assembly comprises a plate having upwardly open perforations through which additional steam can be fed in while the principal amount of steam comes directly into the individual compartments (stages) through laterally arranged connection pieces.

However, with all systems or apparatus of the described type that are known so far and which are equipped with simply perforated bottoms, it has been found that plain perforation bores result in the formation of so-called steam channels whereby uniform admission of steam to the material to be desolventized is permitted only conditionally, so that a considerable portion of the steam introduced streams through the material unused and, thus, leaves the plant unused. The attained degree of desolventization is extremely inadequate. Fairly usable, i.e. low-solvent, meals can be obtained only by considerable additional input of steam. However, the additional input of steam jeopardizes the economical operation of all these systems, especially as an increased input of energy is required also for the drive of the agitator means in order to overcome the resistance of the wet material in case of the material being subjected to large amounts of steam.

Further, of importance is also the fact that simple perforations in the bottoms are continually clogged by meal particles lodged therein, particularly when an agitator sweeps over the bottom to agitate and turn round the material. The friction of the material on itself or in contact with the agitator elements and with the surface of the bottom results in a continuous comminution of the meal which favors the penetrating of the particles into the holes or perforations in the bottoms.

For this reason the bottoms according to DE-C 26 08 712 already have slightly rounded-off holes or perforations whereby the particles of material that have got into the holes are again ejected therefrom in the manner of a Venturi system. Moreover, by the rounding-off of the edges of the holes it is possible to largely diminish the danger of the formation of steam channels.

In the course of the further development of processes and apparatus for the technical desolventizing of extraction residues of the type referred to above, it has now been found that it is possible to totally meet the requirements of controlled and uniform distribution of steam in the material to be desolventized, of preventing the formation of steam channels (and, consequently, increased, unused, steam consumption), of preventing the comminution of material on the compartment bottoms, and overheating, and steam condensation, as well as preventing particles of material from entering into the perforations in the bottom, while achieving at the same time increased yield and efficiency in regard to material and energy (steam consumption, energy for driving the agitator shaft, throughput of material per unit of time, solvent content in the desolventized meal, degree of recovery of solvent, etc.), if—starting from an apparatus according to DE-C 26 08 712, or, alternatively, from the apparatus known from "Fette-Seifen-Anstrichmittel" (loc.cit.)—the following features are provided (a) the bottom plates of a multistage or multi-compartment system are in the form of double bottoms capable of being heated by means of steam, the bores of the perforations in said double bottoms being formed by individual distance pieces or spacers each having a bore therethrough, the cross-section of the bores being such as to allow the passage of upwardly streaming steam or steam-containing fluid, but not the passage of the material being moved or agitated on the bottoms;

(b) the steam being used for desolventizing is present in superheated form at a temperature of at least 120° C. (248° F.) (normal pressure);

(c) at least 45%, but particularly all, i.e. 100%, of the superheated steam or of the steam-containing fluid is introduced through the lowermost compartment bottom;

(d) the temperature of the escaping vapors consisting of steam and solvent is about 64°–69° C. (147.2°–156.2° F.), particularly between 66° and 68° C. (150.8° and 154.4° F.).

The combination of the features underlying the process according to the invention obtains for the first time a desolventized material (meal) that contains practically no solvent (extractant) or the solvent content of which is so low that the limits of toxicity as well as the ranges of possible development of explosive compositions are not exceeded.

Moreover, there does no longer occur condensation of steam on the individual perforated plates downwardly defining the treatment stages or compartments, or also inside the material being desolventized, does not occur. This is so because the design of the perforated plate, the use of superheated steam, and the constantly recurring redistribution of the superheated steam upon its exit from the perforated plates results in a so-called stripping process which causes uniform carrying out or removal of solvent without any formation of channels, eliminates at once any local condensation of steam, keeps the solvent-wet or partially desolventized material on the upper bottoms in a uniform state of suspension, thereby also relieving the driving shaft of the agitator system and eventually making possible the attainment of a temperature of the escaping vapors which comes near to producing an optimal composition of the azeotrope $H_2O$ vapor/hexane, for example.

If the condition according to the invention regarding the use of superheated steam is not met, that is, if by inadequate of the apparatus, by use of steam containing condensate, by enrichment of the steam in condensate from the moisture of the feedstock, by inadequate maintenance of temperature of the double bottoms etc. there is used, or produced in the process, a steam having condensed $H_2O$ content, the advantages aimed at and improvements offered by the process according to the invention cannot be achieved.

Thus, saturated steam is not suitable for carrying out the process according to the invention. Even in case of using a saturated steam supplied from the steam boiler at a temperature of e.g. 180° C. (356° F.)/10 bar and expanded at entry into the desolventizer to 1 bar it is not possible to prevent the separation of condensate. In such a case, the stripping process on the double bottoms or in the material, which is necessary for smooth and complete desolventizing, is prevented or not fully achieved. The moisture in the material may also increase, the energy required for moving or agitating the material on the perforated bottoms as the degree of desolventizing decreases. To provide for compensation for the incomplete desolventizing, additional amounts of steam will be necessary, but such additional amounts of steam in turn jeopardize the economy of such processes, especially for throughputs of 1,000 metric tons of wet material per 24 hours.

Aside from these efficiency considersations, when using for the desolventizing of the solvent-wet material so-called saturated steam which is not absolutely dry, i.e. not superheated and, thus, contains condensate,—even in case of the use of very recently developed apparatus approximately in accordance with "Fette-Seifen-Anstrichmittel" (loc.cit.) or DE-C 26 08 712—there will still be measurable residual hexane: from 0.04 to 0.1% by weight (case of hexane-containing soy meal; from 0.1 to 0.2% by weight in case of hexane-wet rape meal.

Residual free hexane, or extracting agents similar thereto, in the desolventized material still cause considerable difficulties and problems, although these values already represent a considerable improvement over earlier extraction processes and systems. Difficulties due to the above-quoted residual portions of extracting agent in the desolventized meal arise particularly in loading and transportation on ships, in storage in silos or in packaging and transportation in paper bags and similar packings means. During this handling (packing or packaging, storage, transportation) the residual portions of solvent—particularly at higher than normal temperatures or under direct influence of the sun—are desorbed and react with the air contained in the surrounding and ambient atmosphere or also in the interstitial volumina of the meal to form explosive mixtures.

For example, the lower explosion limit of n-hexane (one of the most important extractants for e.g. soy flakes, rape, linseed, etc.) in air at 20° C. (68° F.) lies at 1.12% by volume. Furthermore, according to IHA (International Health Association) standards, in working with or handling hexane-containing materials, the maximum content of hexane in the air that must not be exceeded is 125 ppm. Hexane belongs in the group of anesthetics. Hexane contents in the air of merely 1% by volume may already be lethal. The values for comparable extractants, such as pentane, butane, heptane, mixtures of n-hexane and iso-hexane or mixtures of these or other hydrocarbons with one another, are similar.

The further reduction of these residual free hexane levels made possible by this present invention is very important. The large number of explosions and fires that have become known to have occurred in storehouses, silos, and on ships, particularly during shipment to more or less torrid zones emphasizes the importance of this desolventizing. The frequent occurance of such explosions and fires are a hazard that has not yet been mastered.

Moreover, the toxic properties of the solvents for the extraction of oil- and fat-containing vegetable material cannot be overrated in their importance for the political economy. The desolventized extraction residues (meals) of soya, rape, linseed, nut and kernel material, sunflower seed, corn, etc. are being used increasingly as feedstuff and, indeed, also as food for human consumption, especially in developing countries. The potentially disastrous effects of improper, i.e., incomplete desolventizing of such materals, underlines the importance of the invention.

With the the present invention, it is for the first time. Possible to obtain desolventized extraction residue (meal) that is practically free of solvent (extractant), or wherein the content of extractants that are toxic and react with air to form explosive mixtures is so low that the hazards or dangers indicated above are eliminated even in unfavorable working conditions.

Moreover, when the invention is used, the moisture content (water content) of the solvent-wet meal as introduced initially will hardly be changed, due to the stripping being achievable only with superheated steam that takes place at the exit from the specifically designed bores in the double bottoms, which assures that no steam condensation takes place. Furthermore, considerable amounts of desolventizing steam are saved, as mentioned before.

Specifically, in a known plant of the type belonging to the state of the art and using saturated steam or non-super-heated steam, considerable accumulation of water in the desolventized material was observed.

Hexane-wet soya meal entering the desolventizing apparatus with a water content of 15% by weight, when treated with saturated steam, had a water content of 22% by weight at the exit from the desolventizing process. Although this water content does not much impair the quality of the desolventized meal as the material will later be subjected to drying, yet the water contained in the issuing desolventized material was introduced by condensation of the desolventizing steam, so that considerable unused steam consumption, corresponding to the difference of input and output values, has to be noted.

The consequence again is either higher expenditure of steam or higher expenditure of energy for the subsequent drying (e.g. by means of hot air).

Finally, apart from the additional expenditure required by desolventizing apparatus using the use of saturated steam for the driving out of condensate or for maintaining an original water content in the desolventized material, considerable amounts of steam are also saved by the process according to the invention also due to the higher theoretical heat content of superheated steam. This is illustrated by the following comparison: A soya residue material having been deoiled and, hence, subjected to extraction with a solvent, in the present case hexane, (hexane-wet soya meal), contains, on the average, about 15% by weight water and between 30 and 35% by weight hexane. This means that with a charge of 1,500 kg. of hexane-wet meal, approximately 500 kg. hexane must be driven out in the desolventizing.

SUMMARY OF THE INVENTION

The meal is fed to the desolventizer at an average temperature of about 60° C. (140° F.) (from the extraction after separation of the oil-containing miscella) and is treated with steam at about 105° C. (221° F.). The amount of heat required for 1,000 kg. hexane-free meal—1000×0.5 (spec. heat)×(105-60)=45° C.—is approx. 22.500 kcal. Further, 500 kg. hexane must be vaporized. 500×85 (heat of vaporization)=approx. 42.500 kcal. Thus, theoretically, the total heat required for the desolventizing of 1,500 kg. hexane-wet meal with about 33% by weight hexane is approx. 65.000 kcal. When taking into account the usual energy losses due to the prevailing operating conditions (about 8%), a heat input value close to the practice is 70,000 kcal.

When using saturated steam (heat content 640 kcal/kg.), this requires 109.4 kg. steam. When using superheated steam (heat content 695 kcal/kg.), 100.6 kg. are sufficient, the saving consequently being 8.8 kg. steam per 1,000 kg. desolventized meal.

With present-day large-scale plants with throughputs of the order of over 1 million metric tons of hexane-wet meal, e.g. soya meal, per year, this means over 8,000 metric tons of steam.

The apparatus according to the invention particularly suited for carrying out the new process will be described by reference to FIGS. 1-5, of which

Figure 6:
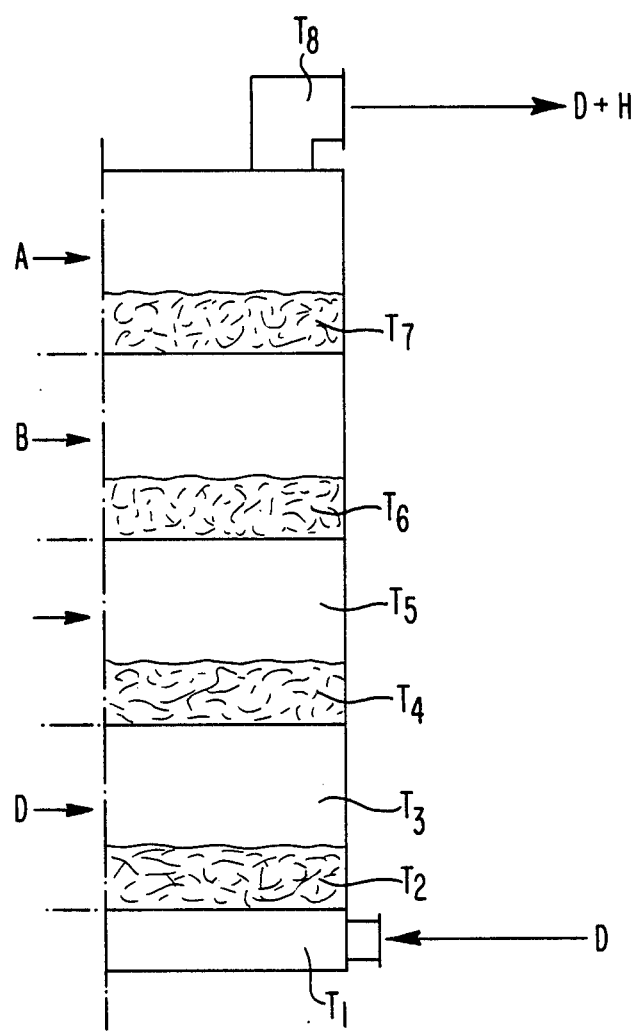
FIG. 6 shows a schematic multistage or multi-component system with temperature measuring points according to Table I of the specification.

The significance of FIGS. 6 and 7 will be further discussed later, following the discussion and description of the apparatus according to the invention.

DETAILED DESCRIPTION OF THE PREFERRED EMBODIMENT

Figure 1:
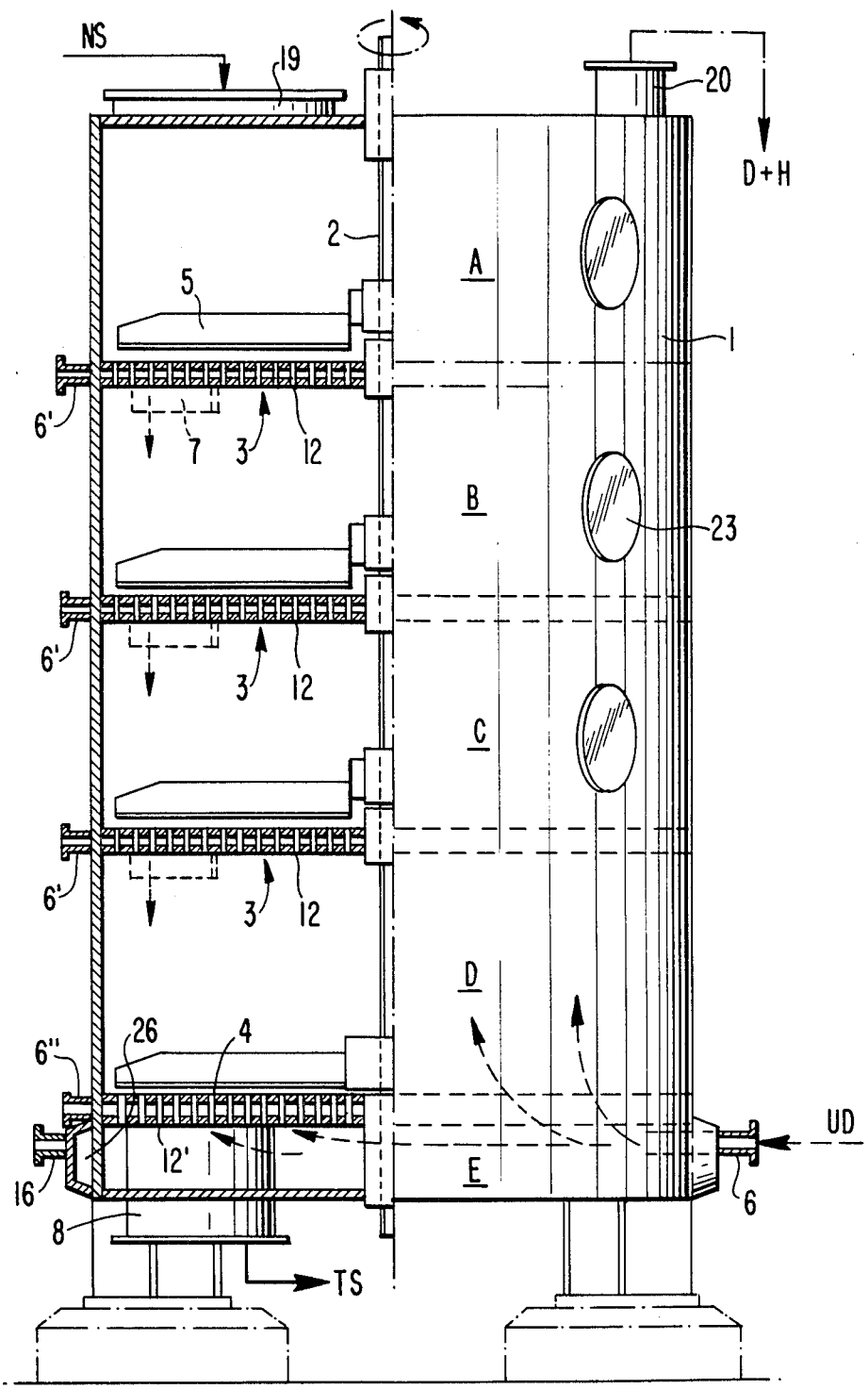
FIG. 1 shows the general structure of an apparatus according to the invention schematically, omitting all construction and control elements that are self-evident and not decisive for the invention itself.

According to FIG. 1, the apparatus consists of the particularly cylindrical reaction vessel (1) with a centrally inserted drive shaft (2) for effecting horizontal movement of a number of agitator arms (5) corresponding to the number of treatment stages (A,B,C,D . . . ). The showing of the drive for the agitator shaft (2) or the exact indication of the mounting and support thereof etc. in the reaction vessel (1) has been omitted as such construction elements are self-evident to the man of ordinary skill in the art. This applies also—and this is said here on principle—to all other auxiliary means of apparatus construction, such as valves, piping, elements for measuring and control, accessory units, such as heat exchangers, dosing or metering means, charging and discharging elements, cyclones, condensate separators etc.

The agitator arms (5) move over and at a slight distance from the bottoms (3) of the treatment stages (compartments) and, respectively, the lowermost bottom (4) which serves exclusively for distributing the steam. By the motion of the agitator arms (5) slightly above the bottoms (3, 4), the solvent-wet material (from the extraction; NS), which is brought in through suitable dosing or metering means (sluice or valve, bucket wheel, worm etc.) by the connecting piece (19), is kept in mixing motion.

By the motion of the agitator arms (5), the material, e.g. hexane-wet residue of the extraction of soy flakes or of an oil- and fat-containing material of other origin, gets to suitable discharge means (7), e.g. rotary valves of the type described in "Fette-Seifen-Anstrichmittel" (loc.cit.) and through the latter into the compartment disposed thereunder, that means, from (A) to (B), to (C), etc., until leaving the apparatus through the lowest connecting piece (8) (TS).

At the same time, superheated steam (ÜD) is introduced into the apparatus through connecting piece (6), namely, underneath the lowest bottom (4) into the steam distributing chamber ("E").

Instead of pure superheated steam, there may also be used a steam-containing fluid, such as nitrogen, air, inert gas etc., but, preferably, pure superheated steam is used.

The superheated steam having entered the chamber (E) gets—in the direction of the arrows as shown—through the perforations of the lowermost bottom (4) into the compartment (D) disposed thereover, etc., streams—in uniform distribution and with the superheating being maintained—through the material to be desolventized being moved or agitated on the respective bottom and leaves the plant as vapors (D+H) through the connecting piece (20).

The bottoms closing the treatment stages (A,B,C,D . . . ) are in the form of double bottoms adapted to have steam (6') admitted thereto, so that it is possible to adjust and control the temperature of the steam or, respectively, the vapors as well as the temperature of the material, as required or desired in the individual treatment stages (A,B,C,D . . . ).

Of special importance for the achieving of complete, or practically complete, desolventizing of the solvent-wet material (NS) without condensation of steam or without increase in the moisture content in the desolventized material, at considerably improved thermal efficiency and energy efficiency—as is aimed at and solved by the invention—is the maintenance of the superheated state of the steam throughout the entire system, but especially in the region of the bottoms closing the stages or compartments, in the region of the steam chamber (E), etc., which is achieved only by absolute insulation of the apparatus, by the provision of steam-heated jackets (26), as for the steam chamber (E), but also for the entire apparatus—not shown—or other heating facilities (steam inlet connection 16). The perforations or apertures in the double bottoms (3) are formed by individual bored distance pieces or spacers (12) the construction of which will be explained in detail in the following.

Figure 2:
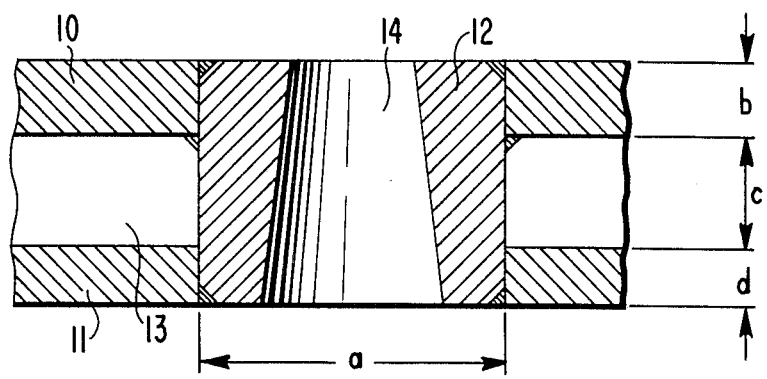
FIG. 2 shows the distance pieces or spacers used for forming the double bottoms and having bores or apertures, with indication of usual dimensions.
Figure 3:
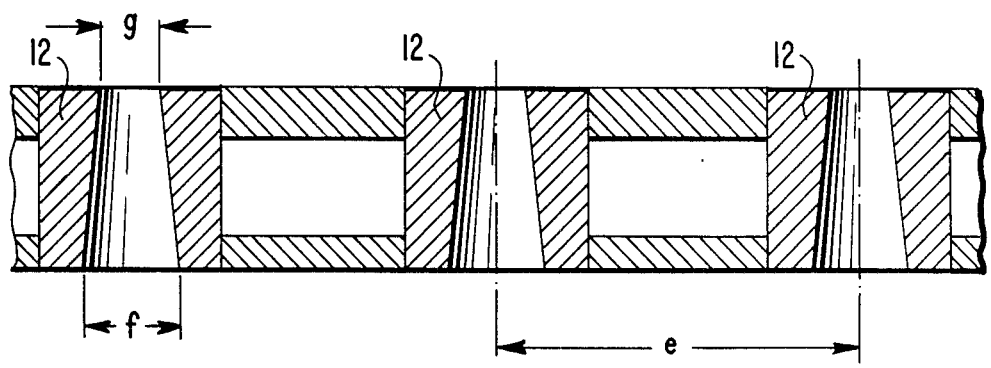
FIG. 3 shows a plurality of spacers arranged side-by-side and their distance relation to one another.

As is shown by FIGS. 2 and 3, the double bottom (3), and, if necessary, also the lowest bottom (4) serving to distribute the steam, each consist of two bottom plates (10,11) enclosing a steam space (13) therebetween. This steam space is supplied with live steam (6' in FIG. 1 ). According to the invention, so-called spacers or distance pieces (12) are inserted into the holes formed in the plates (10,11) by bores, the plates (10, 11) being connected with each other and held by said spacers (12). The connection is made in known manner by welding, so that thereby a steam-tight closure or seal is provided between the steam space (13) and the holes in the plates. The spacers (12) themselves also have bores

(14) therethrough; said bores preferably have the configuration according to FIGS. 2 and 3, that means, they taper conically from the lower end—at the lower plate (11) of the double bottom (3)—to the top end—at the upper plate (10) of the double bottom. This preferred configuration is of advantage whenever the process steam coming from the lowermost steam distributing plate (bottom 4) (6") is to be used also as drying steam for material containing water in a special measure, i.e. material having besides the usual hexane content of approx. 25 to 35% by weight a higher than normal moisture content. By the form of the spacers according to FIGS. 2 and 3 the steam when issuing from the bores (14) is imparted additional tension, which results in a pronounced bubble action of the steam and consequent optimal whirling motion of the material being desolventized, but without formation of channels. The form of the spacers as shown in FIGS. 2 and 3 has proved especially successful also for the formation of the lowermost bottom (4), which, after all, serves only to distribute the steam.

Figure 4A:
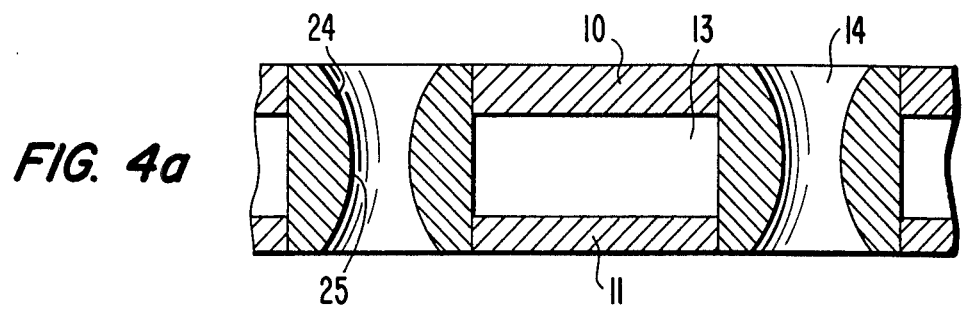
FIGS. 4a and 5a-b show further possibilities of constructing the spacers.
Figure 4B:
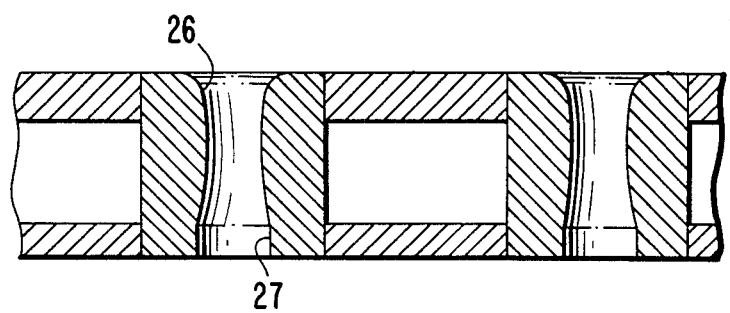
Figure 4C:
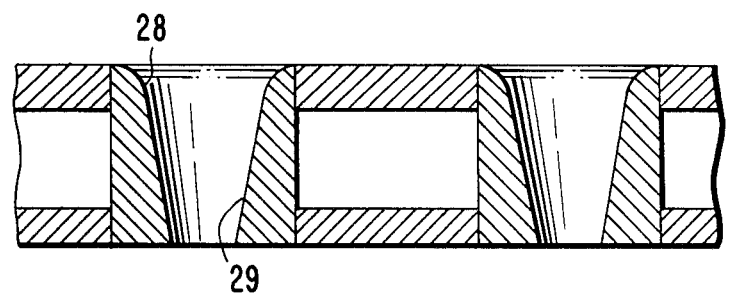
Figure 4D:
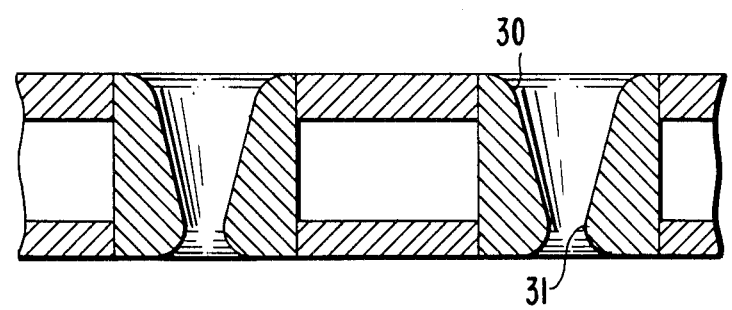

Further favorable developments of the spacers (12) which consider the process conditions given in each case, particularly the material used, are shown by FIGS. 4a, 4b, 4d as well as 5a and 5b.

According to FIG. 4a, the spacers are rounded off at both ends, forming double-cone openings or passages (14) for the superheated steam. While the effect of the rounding off of the edges, whereby, for example, particles of material that have got into the bore (14) are thrown out by the steam tension increased in (25), can be achieved also by a unilateral cone formation (24) only, the additional rounding off also of the lower edge results in a considerably improved streaming in of the stream into the bore as a possible turbulence at the entry of the steam into the bore is counteracted.

In the construction of the spacers (12) according to FIG. 4b, the lower cone passes over into a cylindrical or even square or rectangular offset opening (27), while the radius of the upper cone (26) is somewhat reduced compared to that of (24) according to FIG. 4a. It is understood that the radius of the rounded portion or curvature according to FIG. 4b may also be equal to, or greater than, that of the rounded portion or curvature according to FIG. 4a. The bore (14), according to FIG. 4c, may also be of a form conically enlarging (29) from the bottom to the top and then ending also with a rounded-off edge (28).

The formation of the bore (14) shown in FIG. 4d is in the manner of a Venturi tube with the edges (30) being rounded off corresponding to FIG. 4c but the rounding-off of the lower edge (31) showing a reduced radius that falls into the boundary zone of the plane of the lower plate (11) of the bottom (see FIG. 2).

Figure 5A:
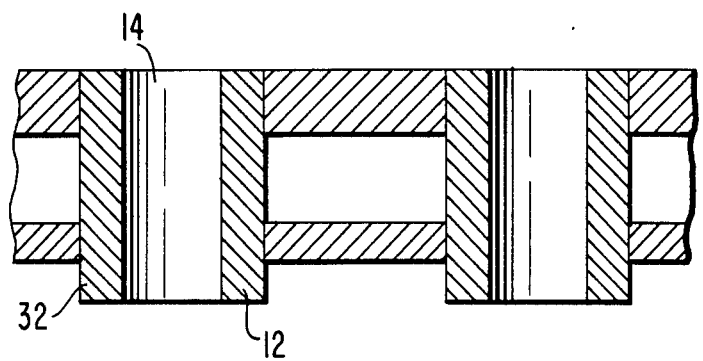
Figure 5B:
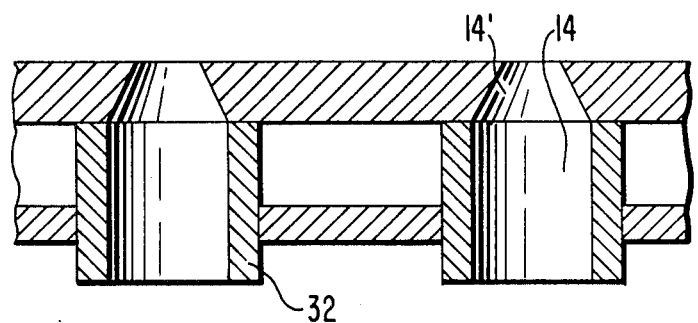

In the simplest case, according to FIGS. 5a, and 5b, spacers are also possible in the form of tubular pieces the lower cylindrical ends of which extend slightly beyond (32) the lowermost plate boundary and into the next following treatment stage or compartment (B,C,D ...). According to experience, this extension (32) may be about 0.5–2.0 times the thickness of the plate (11). A special formation of such spacers may again include a conical configuration (14') in the upper plate (10) of the bottom, whereby the effect of the spacers according to FIGS. 2 and 3, in connection with the extended end (32), is still further enhanced.

It is understood that each of the above-described forms of the spacers or types of bores (14,14') has a quite specific effect which serves to increase or maintain the tension of the steam at the exit from the bores, prevents the formation of channels in the material being desolventized, counteracts steam condensation, favors the stripping effect, prevents congestion of the bores by particles of material and ensures uniform action of the steam on the material being desolventized. Thereby, considerable amounts of steam are saved and the consumption of electric energy, e.g. for driving the agitator elements, is reduced.

In practice, such double bottoms (3) or (4) according to [hereby FIGS. 2-5 have proved satisfactory in which—not excluding] usual technical deviations or specific dimensions or proportions—the lower plate (11) has a thickness d=approx. 8 to 15 mm, the upper plate (10) a thickness b=approx. 14–22 mm, and the distance between said plates c=approx. 12–30 mm.

The external diameter (a) of the spacers (12) generally is in the range between 25 and 75 mm.

The distance (e) between the individual spacers (12)—see FIG. 3—may be equal, smaller or greater than the external cylindrical diameter (a) of the spacers themselves. Generally, however, the distance (e) is equal to or greater than the external cylindrical diameter of the spacers. Especially satisfactory has been found a distance e=80 mm with a diameter of a=e.g. 50 mm.

In case of spacers (12) that are not circular cylindrical or oval, but square, rectangular or polygonal the conditions in regard to dimensions and sizes are similar.

In case of conical bores (14) according to FIGS. 2 and 3 with an upwardly tapering cone, the inclination of the inner surfaces of the cone is such that the ratio of the two taper bore areas (f):(g) is at about 2.0–1.5.

This aperture ratio has proved to be favorable e.g. in the desolventizing of hexane-wet soya meal with superheated steam especially when the diameter of the bore in the region of the lower bottom plate (11) does not exceed the value of approx. 25 mm.

With a large apparatus of the construction defined above by reference to FIG. 1, with three treatment stages (A,B,C) each closed downwardly by a steam-heated double bottom (3), wherein the overall useful height of the apparatus is approx. 5,500 mm and the internal diameter is approx. 3,000 mm, the double bottoms (3) have between 60 and 140 spacers (12) per m$^2$ of bottom area, so that the bores (14) constitute a cross-sectional proportion of approx. 3–30% of the total bottom area.

In such a plant it is possible to desolventize in continuous operation approx. 480 metric tons (480×10$^3$ kg.) per 24 hrs. of hexane-wet soya meal having a hexane content of up to 33% by weight.

The desolventized meal has a residual hexane content of <<0.01% by weight in case of the use of superheated steam of 205° C. (401° F.) and a residual hexane content of <0.01% by weight in case of the use of superheated steam of 125° C. (257° F.).

Such values cannot be realized when using steam other than superheated steam, not even with the specially designed double bottoms (special bores) according to the above-described apparatus.

If the desolventizing steam used is not superheated, the hexane content in the meal in case of the use of steam of 130° C. (266° F.) is still in the region of 0.06% and in case of the use of steam of 160° C. (320° F.) in the region of 0.03%.

Conversely, in case of the use of a simply perforated bottom system, i.e. a system not having the specific bores of the present invention and thus having only circular or similarly formed steam outlet openings, it is not possible to achieve the surprisingly low residual hexane contents in spite of the use of superheated steam.

The reason is to be seen in the fact that only the combination of the bottom construction with superheated, absolutely dry steam that is introduced into the desolventizing apparatus at as high a temperature as possible will result in a practically solvent-free meal.

The desolventizing apparatus shown quite generally in FIG. 1 can—without leaving the scope of the invention—still be technically refined in many respects. Thus, to complete the plant, there may be provided below the double bottoms (3) connections for the introduction of additional live steam, i.e. connections directly leading into the respective steam space of one of the treatment stages (A,B,C,D...); that additional steam is of course also superheated. This steam serves to assist the superheated steam (ÜD) introduced into the steam chamber (E) at (6) according to FIG. 1, e.g. in case of solvent-wet material having a high water content, in case of meal difficult to desolventize or also in case of relativley low temperatures of the superheated steam, e.g. in the absence of suitable means for intensive superheating.

To the same effect such additional steam may also be introduced by way of the agitator shaft (2) or by way of the agitator elements (5), although such a measure is only of minor importance in the scope of the present invention.

Of special importance for the process according to the invention is also the adjusting of a relatively narrow range of temperature of the vapors consisting of steam and solvent above the topmost process stage, i.e. above the freshly introduced solvent-wet material.

In this connection, the temperature gradient, in all, from the steam inlet at (6) into the distributing chamber (E) up to the vapor outlet at (20), is also a factor of decisive importance.

First of all, the requirement has to be fulfilled that—independent of the number of the treatment stages (A,B,C,D...)—the steam below the lowermost bottom plate (4) should itself have an optimal temperature. On priniciple, no temperature limits are give for the superheated steam, so that steam temperatures of over 120° C. (248° F.) are already quite useful. However, for reasons of economy, for optimal utilization especially oflarge-scale plants, it is advisable, as far as possible, to use temperatures not lower than 130° C. (266° F.), so that a certain distance from the condensation temperature (100° C./1 bar) is given already at the steam inlet. Preferably, one works with steam inlet temperatures of over 150° C. (302° F.) or, better, over 180° C. (356° F.) and sometimes also up to 220° C. (428° F.).

These temperature gradients are just as much a function of the remaining process conditions and qualities of material as is the amount of steam used—which, generally, must be adjusted for each material—or the amount of steam introduced below the lowest bottom.

Generally, all of the superheated steam, i.e. up to 100% of the amount of superheated steam required—no matter [form whether such steam is in the form of pure steam or in the of a mixture of steam with a suitable fluid—is introduced directly into the steam chamber (E). This is always the case if the number of stage or compartments (A,B,C,D...) is of the order according to FIG. 1 or less. In case of more than four stages, however, it is advisable to introduce the bulk of the steam again into the steam chamber, that means, into the lowermoster chamber or compartment below the steam distributing bottom (4), and a partial amount, i.e. the quantitive balance to make up 100%, into the spaces in the higher compartments below the respective stage closure bottoms (3) where the escaping vapors collect. The utmost limit for the distribution of the steam among the lowest stage or steam chamber on the one hand and the vapor spaces on the other hand is at about 45%, that means, irrespective of the number of stages or compartments, at least 45% of the total amount of live steam in superheated form that is required must be introduced below the steam distributing bottom (4).

The superheated steam generally is supplied by the steam boiler of the mill and is available at an average pressure of 10 bar. On entering the steam chamber (E) the steam expands to 1 bar, as it is only in rare cases that desolventizing is performed under overpressure conditions. If no superheated steam is available from the steam boiler of the mill, the necessary degree of superheating can be adjusted also by interposition of a superheater before the entry of the steam into the steam chamber (E). Suitable superheaters are well-known so that they need not be described here.

The stripping effect repeatedly referred to hereinbefore can be realized only with superheated steam being absolutely free of condensate, and only thus can the desired azeotrope steam/solvent be maintained in its ideal composition with a narrow temperature range of the vapors without substantial alteration of the water content in the desolventized material.

In continuous operation of a multistage or multi-compartment system according to FIG. 1 there will result throughout the height of the plant temperature diagrams which are specific for the process according to the invention and which reflect the ideal desolventizing conditions aimed at. This will be shown on the basis of Table I by reference to FIG. 6.

In this connection, Table I shows the effective temperatures established in continuous operation of a large-scale technical plant which appear in a plant comprising four treatment stages or compartments (A,B,C,D according to FIGS. 1 and 6) in the desolventizing of hexane-wet soy meal as well as of hexane-wet rape material.

TABLE I

| | Temperature in °C. at the Measuring Point | |
|---|---|---|
| Measuring Point | Soy Meal 33% Hexane approx. 15% $H_2O$ | Rape Meal 30-32% Hexane approx. 9-10% $H_2O$ |
| $T_1$ (steam chamber E) | 180 | 180 |
| $T_2$ (in the material of stage D) | 115-116 | 120-122 |
| $T_3$ (vapor space of D) | 115-116 | 120-121 |
| $T_4$ (in the material of C) | 112-114 | 118-120 |
| $T_5$ (vapor space of C) | 112-115 | 118-119 |
| $T_6$ (in the material of B) | 112-114 | 115-116 |
| $T_7$ (in the material of A) | 64-66 | 67-68 |
| $T_8$ (vapor outlet) | 66-68 | 66-68 |
| Hexane Content: | <<0.01% | <0.01% |

As is shown by Table I, there are maintained temperatures in the individual process stages up to and including stage (B)—measuring point $T_6$ in the material of stage (B)—which, at 112° C. (233.6° F.) and 115° C. (221° F.) respectively, are considerably above the temperature of condensation of steam. As late as in the region of the freshly introduced hexane-wet material, i.e. in the material of stage (A)—measuring point $T_7$—does there appear a marked drop in temperature, which, however, is not caused by condensed steam but results from the formation of the azeotrope steam/hexane.

A comparative experiment showed that in case of the use of wet steam, under identical technical conditions, i.e. even with the use of an apparatus according to the invention, temperatures only slightly over 100° C. (=212° F.) (103°-105° C.) (=217.4°-221° F.) were measured already in the region of measuring point $T_2$. The temperature at measuring point $T_4$ was 98° C. (208.4° F.) for soy meal, 99° C. (210.2° F.) for rape. The temperature at measuring point $T_6$ was 80° C. (176° F.) for soya, 81° C. (177.8° F.) for rape. On the other hand, the vapors had to be maintained at over 70° C. (158° F.) by considerable additional steam in order to arrive at a desolventized material, which, however, still had a residual hexane content of 0.06% by weight (soya) or 0.03% by weight (rape) respectively.

As has been stated hereinbefore, in case of the use of steam other than superheated steam, the amount of steam required is many times that required in the case of superheated steam as otherwise it is not possible to counter the condensation of steam. This, however, means at the same time an additional load on the driving shaft for the agitator as the material itself remains in a state of increased water content which impedes the rotary motion of the agitator elements.

On principle, it is pointed out here that when superheated steam is used in an apparatus not showing a design of the compartment bottoms according to the invention, as is known e.g. from "Fette-Seifen-Anstrichmittel" (loc.cit.), the extremely low residual hexane contents according to the invention, the narrow temperature range of the steam-hexane vapors in connection with great economy (amount of steam, energy for agitator driving shaft, etc.) cannot nearly be achieved.

With regard to the saving in steam by the process according to the invention the following reflection should be noted which supplements the heat balance made up hereinbefore. By this reflection, the significance of superheated steam for the desolventizing of solvent-wet material once more comes to the fore.

As is well-known, the paraffin hydrocarbons $C_nH_{2n+2}$, by $C_4$ through $C_9$, which alone are of importance in technical extraction processes of the oil and fat industry, form, in connection with steam, more or less distinct azeotropes which are alone responsible for an optimal steam/solvent ratio in the vapors in desolventizing. The commercial hexanes which have boiling points only little higher than 60° C. (140° F.) (normal pressure) (boiling point of n-hexane: 69° C. (156.2° F.); iso-hexane: 60° C. (140° F.); benzine containing over 50% n-hexane: 62°-64° C. (143.6°-147.2° F.) will, for reasons of azeotrope formation, carry corresponding proportions of steam, as entrainer, out of the desolventizing system.

As the content of steam in the vapors of desolventization present in azeotrope form is a function of the temperature of the vapors, the maintaining of a particular temperature of the vapors is of decisive importance for optimal utilization of the steam with a view to the formation of the azeotrope.

Figure 7:
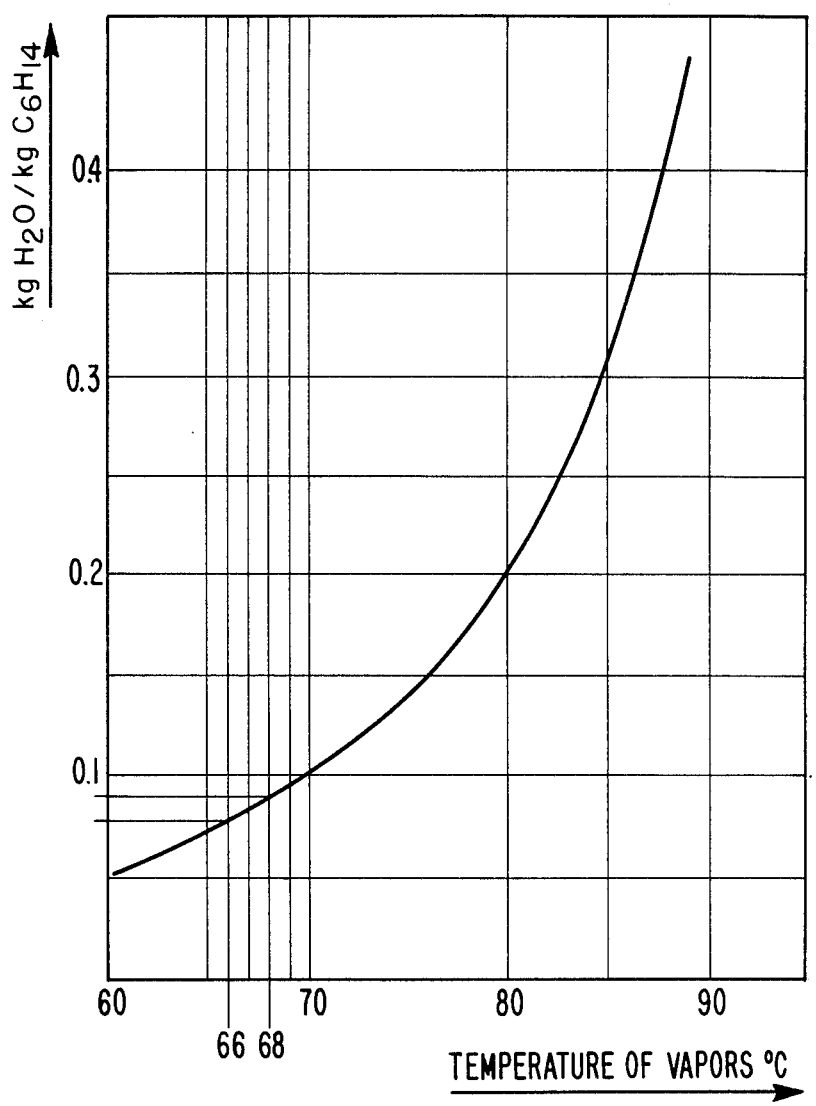
FIG. 7 shows the content of steam in the escaping vapors as a function of the temperature of the vapors.

Table II, in connection with FIG. 7, shows the quantity of steam absorbed, or entrained as azeotrope, by one kilogram of hexane, plotted against the temperature of the vapors.

TABLE II

| Temperature of Vapors °C. ($T_8$ in FIG. 6; D + H) | Kilograms of Steam per one kg. of Hexane |
|---|---|
| 60 | 0.500 |
| 65 | 0.075 |
| 66 | 0.080 |
| 67 | 0.085 |
| 68 | 0.090 |
| 70 | 0.100 |
| 75 | 0.135 |
| 80 | 0.200 |
| 85 | over 0.300 |

It follows from the values of Table II that in any case the temperature of the vapors (D+H in FIG. 6) must be kept as low as possible.

At a temperature of the vapors of not more than 70° C. (158° F.), the solvent, i.e. in this particular case hexane, already entrains 0.1 kg. steam per kg. of hexane, this amount of steam being carried out of the plant unused. At a temperature of the vapors of 80° C. (176° F.), the amount of steam leaving the plant unused already is 0.2 kg per kg. hexane, and at 85° C. (185° F.) 0.3 kg.

When using superheated steam of as high a temperature as possible (see Table I; 180° C., superheated), it will not be difficult to adjust a temperature of the vapors ($T_8$ or D+H) of 66°-68° C. (150.8°-154.4° F.) even in case of large-scale operation involving a throughput of material of more than 2500 metric tons per 24 hrs. The steam entrained by the expelled hexane unused is reduced to a minimum of approx. 90 g/kg. hexane (temperature of vapors 68° C. (154.4° F.)).

Conversely, when using steam that is not superheated, it will be necessary to provide for temperatures of the vapors of over 70° C. (158° F.) or, due to the considerable additional amounts of steam, even over 80° C. (176° F.), to achieve as high a degree of desolventization as possible. However, a result of such high temperatures of the vapors is that, according to Table II, the amount of steam leaving the plant unused will be 100 g. steam per kg hexane in case of vapors at 70° C. (158° F.) and as much as 200 g. steam per kg. hexane in case of vapors at 80° C. (176° F.), that means, the additional steam input required merely due to "loss" is, in case of vapors at 80° C. (176° F.), already more than twice the steam input required for vapors of 66°-68° C. (150.8°-154.4° F.). The latter, however, can be achieved only with superheated steam.

Finally, on principle, it is pointed out that in FIGS. 1-5, particularly in FIG. 1, the apparatus according to the invention is shown only schematically. The auxiliary elements well-known to anyone skilled in the art such as temperature measuring points, steam inlet and outlet means, insulations, walkways etc. are not shown. Sight glasses (23) have been included in the drawing as representative of the accessories. The short feed pipe (6") serves to feed in heating steam for the bottom (4) above the steam chamber (E).

I claim:

1. Process for desolventizing residue material obtained in the extraction of substances with organic solvents so as to remove fire and toxicity hazards affecting shippers and consumers, the desolventizing being effected with superheated steam or superheated steam-containing fluids in continuous operation in countercurrent, wherein the solvent-wet material to be desolventized is conducted in opposition to said steam or steam-containing fluid, falling downwardly by gravity through one treatment stage or a plurality of treatment stages, the individual treatment stages being defined by perforated plates having overflow means, agitating means being moved slightly above said perforated plates, the space below the lowermost perforated plate serving to distribute the steam, said apparatus being characterized in that the perforated plates defining the respective treatment stages are double bottoms capable of being heated by means of steam, said double bottoms having bores formed by individual distance pieces or spacers each having a bore therethrough, the cross-section of said bores being such as to allow the passage of upwardly streaming steam or steam-containing fluid, but not the passage or the entrapment of the material being moved on the bottoms, said process being characterized in that the steam being used for desolventizing is present in superheated form at a temperature of at least 120° C. (248° F.) (normal pressure), particularly at least 130°–180° C. (266°–356° F.), preferably up to 220° C. (428° F.), in that at least 45%, but particularly 100% of said superheated steam is introduced below the lowermost perforated plate, which serves to distribute the steam, and in that the escaping vapors of steam and solvent are obtained at a temperature of about 64°–69° C. (147.2°–156.2° F.).

2. Process according to claim 1, characterized in that the superheated steam, whether it is present as such or in a fluid, is at a temperature of 220° C. (428° F.)/1 bar.

3. Process according to claim 2, characterized in that the temperature of the vapors formed of steam and solvent is between 66° and 68° C. (150.8° and 154.4° F.).

4. Process according to claims according to any one of 1–3, characterized in that there is used as the material to be desolventized the hexane-containing residue from the extraction of soy, rape, and sunflower material.

5. Apparatus for desolventizing flaky or granular residue material obtained in the extraction of substances with organic solvents, said apparatus being adapted to remove the fire and toxicity hazards affecting shippers and consumers of the material, the desolventizing being effected with superheated steam or a superheated steam-containing fluid in continuous operation, wherein the material to be desolventized, falling downwardly by gravity, is contacted with the superheated steam or the superheated steam-containing fluid, said apparatus comprising a vertically arranged reactor which is subdivided into individual treatment stages by perforated bottoms (3) which in their turn are defined by upper (10) and lower (11) plates, said bottoms having overflow means (7), agitator or rabble means (5) which are secured on a common shaft (2) and are moved by the latter slightly above the perforated bottoms (3) defining the treatment stages, said apparatus characterized in that the perforated bottoms defining the treatment stages (A . . . D, etc.) are double bottoms having a vapor space (13) adapted to have steam admitted thereto for heating the bottoms to prevent condensation in the apparatus, said double bottoms (3) having perforations formed by individual idstance pieces or spacers (12) each having a bore (14) therethrough, the cross-section of said bores being such as to allow the passage of the superheated steam or the fluid containing the superheated steam used for desolventizing, but not the passage or the entrapment of the material being moved on said double bottoms (3) and to prevent the formation of steam channels in the residue material; and means for introducing superheated steam or a superheated steam-containing fluid below at least one of said bottoms.

6. Apparatus according to claim 5, characterized in that the lowermost perforated bottom (4), which serves exclusively to distribute the superheated steam or the fluid containing the latter, is also in the form of a double bottom adapted to have steam admitted thereto.

7. Apparatus according to one of claims 5 or 6, further characterized in that the lowermost perforated bottom (4) has the same construction as the other bottoms (3).

8. Apparatus according to claim 5, characterized in that the lowermost steam inlet zone (E), which serves exclusively to distribute the superheated steam or the fluid containing superheated steam, is totally heatable by steam (16, 26).

9. Apparatus according to claim 5, characterized in that the bores (14) of the spacers (12) are of conical configuration tapering from the lower bottom plate (11) to the upper bottom plate (10) of the double bottom (3).

10. Apparatus according to claim 5, further characterized in that, with a lower plate thickness (11) of d=8–15 mm and an upper plate thickness (10) of b=14–22 mm, the vapor space (13) has a height c of approximately 12–30 mm and the spacers 12 are mostly cylindrical, having diameter a of approximately 25–75 mm.

11. Apparatus according to claim 5, characterized in that the steam-heated double bottoms (3) include between 40 and 200, particularly between 60 and 140, bored spacers (12) per $m^2$ of bottom area and the cross-sectional proportion of all bores is between 3 and 30%, particularly between 4.5 and 20% of the total bottom area.

12. Apparatus according to claim 5, characterized in that connection pieces are provided underneath the double bottoms (3) for feeding in superheated steam into the respective spaces for escaping vapors.

13. Apparatus according to claim 5, characterized in that the agitator arms (5) as well as the rotary shaft (2) are constructed for the direct feeding in of superheated steam into the treatment stages (A,B,C.D . . . ).

14. A reactor adapted to reduce the solvent content of the flaky or granular residue material obtained in the extraction of substances with organic solvents to not more than 0.01%, said reactor comprising:
   at least one perforated bottom dividing the reactor into vertically-arranged treatment stages;
   means for introducing superheated steam into the reactor below said perforated bottom;
   means for removing steam and solvent vapor from the top of the reactor;
   means for heating said perforated bottom;
   means for depositing said resiude material on said perforated bottom;
   means for agitating said residue material on said perforated bottom; and
   each perforation in said perforated bottom having a bore, said bore having a cross-section such that the perforation permits the passage of superheated steam, but not the passage or entrapment of the residue material, and prevents the formation of steam channels in the residue material whereby solvent-free residue is obtained.

15. A process for reducing the solvent content of flaky or granular residue material obtained in the extraction of substances with organic solvents to not more than 0.1%, in a reactor having a perforated bottom said process comprising the steps of:
providing superheated steam in the reactor at a temperature of at least 120° C. (248° F.) at normal pressure;
providing at least 45% of said superheated steam below said perforated bottom;
heating said perforated bottom to prevent condensation of the superheated steam in the reactor; and
obtaining steam and solvent vapors from the reactor at a temperature of about 64°–69° C. (147.2°–156.2° F.).

16. Apparatus according to claims 5 or 14, characterized in that the bores of the spacers are of a conical configuration that tapers from the lower plate to the upper plate of the double bottom.

17. Apparatus according to claim 5 or 14, characterized in that the bores of the spacers are double-cone passages having rounded edges and having the smallest diameter in the middle of the bottom.

18. Apparatus according to claims 5 or 14, characterized in that the bores are of rounded-off, conical configuration in the region of the upper bottom plate (10), while an offset opening is provided in the region of the lower plate of the bottom.

19. Apparatus according to claims 5 or 14, characterized in that the bores of the spacers have a conical, upwardly enlarging configuration in the region of the lower plate, said configuration changing in the region of the upper plate (10) of the bottom into a conical, rounded-off configuration.

20. Apparatus according to claims 5 or 14, characterized in that the bores of the spacers are formed in the manner of a Venturi tube.

21. Apparatus according to claims 5 or 14, characterized in that the external surfaces of the spacers are cylindrical, an end portion of said spacers extending beyond the lower bottom element.

22. Apparatus according to claim 21, characterized in that said spacers terminate against the lower side of the upper plate and the bores within the upper plate are formed by cones tapering upward toward the upper plate.

* * * * *

UNITED STATES PATENT AND TRADEMARK OFFICE
CERTIFICATE OF CORRECTION

PATENT NO. : 4,619,053  Page 1 of 2
DATED : October 28, 1986
INVENTOR(S) : Heinz O. Schumacher It is certified that error appears in the above-identified patent and that said Letters Patent is hereby corrected as shown below:

Column 1, line 53, delete "the" (first occurrence);

Column 1, line 54, delete "as a";

Column 2, line 4, after "56-59", insert --)--;

Column 3, line 68, change "cominu-" to --comminu- --;

Column 5, line 19, delete "considersations" and insert therefor --considerations--;

Column 6, line 12, delete period after "time";

Column 6, line 13, change "Possible" to --possible--;

Column 7, line 1, change "mea-" to --meal--;

Column 7, line 2, delete "l";

Column 11, line 47, change "give" to --given--;

UNITED STATES PATENT AND TRADEMARK OFFICE
CERTIFICATE OF CORRECTION

PATENT NO. :     4,619,053
DATED      :     October 28, 1986
INVENTOR(S):     Heinz O. Schumacher It is certified that error appears in the above-identified patent and that said Letters Patent is hereby corrected as shown below:

Column 11, line 51, change "oflarge" to --of large--;

Column 11, line 65, delete "[form" after "matter";

Column 11, line 66, after "the", insert --form--;

Column 12, line 5, change "lowermoster" to --lowermost--; and

Column 15, line 68, change "idstance" to --distance--.

Signed and Sealed this

Seventh Day of April, 1987

Attest:

DONALD J. QUIGG

Attesting Officer        Commissioner of Patents and Trademarks